(No Model.) 2 Sheets—Sheet 1.
A. A. HOLT.
VEHICLE RUNNING GEAR.
No. 571,764. Patented Nov. 24, 1896.
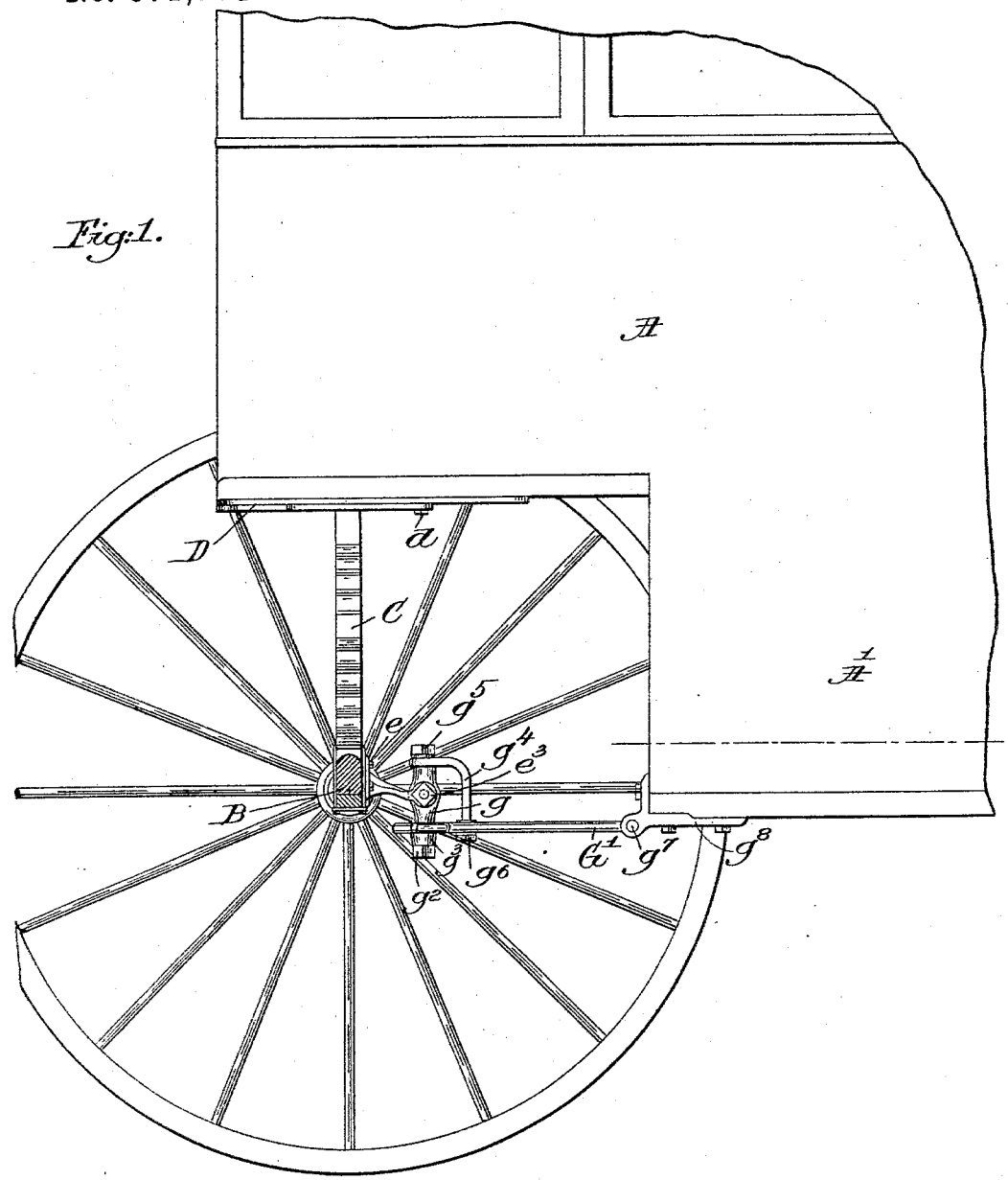
Witnesses.
Fred S. Greenleaf
Thomas F. Drummond
Inventor
Albert A. Holt
by Crosby & Gregory
attys (No Model.) 2 Sheets—Sheet 2.
A. A. HOLT.
VEHICLE RUNNING GEAR.
No. 571,764. Patented Nov. 24, 1896.
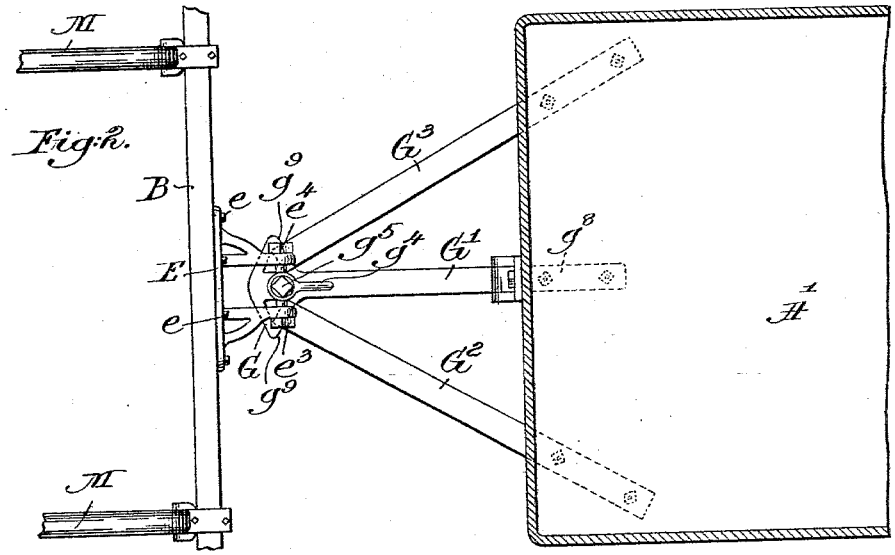
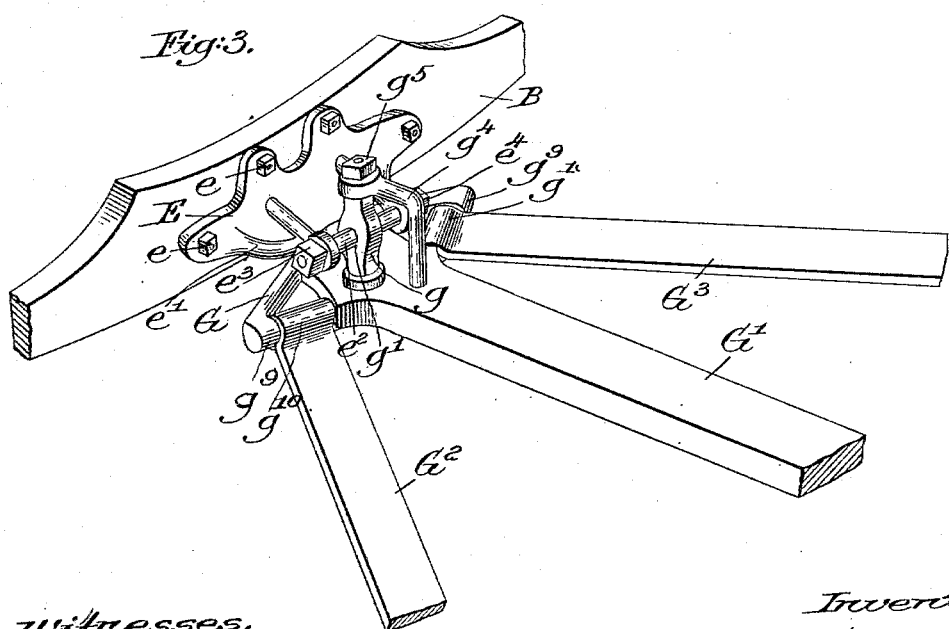

UNITED STATES PATENT OFFICE.

ALBERT A. HOLT, OF FITCHBURG, MASSACHUSETTS.

VEHICLE RUNNING-GEAR.

SPECIFICATION forming part of Letters Patent No. 571,764, dated November 24, 1896.

Application filed April 6, 1896. Serial No. 586,358. (No model.)

*To all whom it may concern:*

Be it known that I, ALBERT A. HOLT, of Fitchburg, county of Worcester, State of Massachusetts, have invented an Improvement in Vehicle Running-Gear, of which the following description, in connection with the accompanying drawings, is a specification, like letters on the drawings representing like parts.

My invention relates to the running-gear of road-vehicles, and is particularly intended for use with light wagons of the kind having a depressed or downhanging middle body portion. The present type of this variety of vehicles, now commonly in use, has the front axle connected to the wagon-body simply by means of the two elliptic springs interposed between the body and the axle, these springs having their rear ends turned toward each other, so that the springs are oppositely disposed obliquely across the axle. Thus all the strains must be received directly by the springs before they are transmitted to the body, and this is very trying, especially in the case of sudden movement, particularly in starting and stopping and passing over obstacles.

My invention has for its object the obviating of the objectionable features of this class of running-gear, providing at the same time a more durable and more efficient running-gear having a low and easy draft.

The details of construction and operation are fully set forth in the following description, reference being had to the accompanying drawings, illustrative of one form of my invention.

In the drawings, Figure 1 is a view, partly in section, showing in side elevation a portion of the body of a vehicle fitted with my improved running-gear. Fig. 2 is a horizontal section, and Fig. 3 is an enlarged view in perspective of a portion of my invention.

In the present embodiment of my invention A designates the body of a vehicle, having a downhanging middle portion A', for which my improved running-gear is especially adapted. The front axle B, the elliptical spring C, and the fifth-wheel or turn-plate D, pivoted at $d$ to the forward end of the body A, may be and are of the common pattern of ordinary running-gears.

Rigidly secured to the axle B by suitable means, as by the bolts $e$, is a bracket E, provided with the extending arms $e'$ or other supporting means for a transverse bolt $e^2$. In the present instance the bolt $e^2$ is carried in the perforated ends of the arms $e'$ and secured by means of a nut $e^3$ at one end and the head $e^4$ at its opposite end. This bolt $e^2$ is the pivotal support of the king-bolt $g$, in direct vertical alinement beneath the pivot $d$, which king-bolt is preferably mounted loosely on the transverse bolt $e^2$ at $g'$, in order that the running-gear and the vehicle-body may have lateral movement relatively one to the other, although the king-bolt $g$ may be fixedly mounted on the bolt $e^2$ and the latter may have a rotative and longitudinal movement in its bracket-bearings $e'$. The provision of this capability of relative lateral movement is to enable the front end of the body to shift slightly to one side or the other, upon meeting an obstruction, without disturbing or straining the vehicle-body. This not only gives ease and smoothness of movement to the vehicle-body, but it is particularly desirable in case, for instance, the vehicle should be used as a milk-wagon. In this case it is very desirable that the milk should be agitated as little as possible and that the wagon-body should not be suddenly shifted sidewise, as is now the case every time a wheel slides into or works out of a rut or street-railway rail or glances off from a small stone or other obstruction in the street. Accordingly I have made provision, as above described, for this relative lateral movement, so that whenever the wheels are shifted sidewise or suddenly lifted by an obstruction this motion is not at once transmitted to the vehicle-body A, but the movement takes place by the bolt $e^2$ sliding sidewise in the king-bolt $g$.

Pivotally connected to the king-bolt $g$ is a reach G', having arms G, pivoted and held on the bolt $e^2$ by means of the nut $g^2$ and washer $g^3$, a hanger $g^4$, perforated at its free end, being clamped onto the king-bolt by the nut $g^5$, and preferably adjustably secured to the reach G' at its opposite end by the nut $g^6$.

The reach G' projects rearwardly from the king-bolt, having, preferably, considerable stiffness, and also preferably hinged at its rear end at $g^7$ to the angle-bracket $g^8$, bolted to the portion A' of the vehicle-body. This reach G' is extended to relieve the spring C of torsion strains due to starting, stopping, and turning, and is preferably disposed somewhat out of direct alinement between the body and axle when the vehicle is unloaded, so that when the load is applied to the vehicle the depression of the body, compressing the spring C, will depress the inner end of the reach without moving the axle B longitudinally.

The arms G are provided with suitable bearings $g^9$, to which the springs $G^2$ $G^3$ are secured by suitable means, as by the loops $g^{10}$, the opposite divergent ends of the springs being firmly bolted to the vehicle-body, preferably at the corners of the portion A' thereof, as shown in Fig. 2. Thus the effect of these divergent springs $G^2$ $G^3$ is not only to brace the body portion of the vehicle and keep it steady, but also to aid the main spring C in receiving and withstanding the various strains to which it is subjected.

The shafts M are attached to the axle B in usual manner, and the draft is thus brought down low and transmitted directly to the lower portion of the vehicle-body by the reach G' and the divergent springs $G^2$ $G^3$.

The fifth-wheel D, with its pivot or center $d$ set back of the axle, is what is commonly known as a "short-turn circle," and to coöperate therewith the king-bolt $g$ is located directly beneath the pivot $d$.

While I have shown and described one particular form of my invention, I do not limit myself to the details thereof, inasmuch as the same may be considerably varied in form, proportion, and arrangement of parts within the spirit and scope of my invention.

What I claim, therefore, is—

1. A vehicle running-gear, having an axle to support the front of the body and pivotally connected therewith, and a supporting-spring interposed between said axle and body, combined with a reach extending forward from said body and connected to said axle by horizontal and vertical pivots, and means for relative lateral movement between said reach and said axle, substantially as described.

2. A vehicle running-gear, having an axle to support the front of the body and pivotally connected therewith, and a supporting-spring interposed between said axle and body, combined with a central reach, and two rearwardly, divergent springs, said reach and springs being attached to said body at their separated ends, and connected at their opposite ends to said axle by a vertical pivot, substantially as described.

3. A vehicle running-gear, having an axle to support the front of the body and pivotally connected therewith, and a supporting-spring interposed between said axle and body, combined with a central reach, and two rearwardly, divergent bars attached at their rear ends to the body, said reach and bars being connected at their forward ends to said axle by a common vertical pivot or king-bolt, substantially as described.

4. In a vehicle of the class described, an axle, a fifth-wheel connecting it with the vehicle-body and directly above the axle, a reach extended forward from the downturned portion of the body, and a pivotal connection between the axle and front end of the reach, the pivot of said connection being located beneath the pivot of the fifth-wheel, substantially as described.

In testimony whereof I have signed my name to this specification in the presence of two subscribing witnesses.

ALBERT A. HOLT.

Witnesses:
JOHN C. EDWARDS,
AUGUSTA E. DEAN.